June 24, 1941.　　J. A. FITZGERALD　　2,247,120
CERAMIC BODY
Filed Feb. 3, 1939

Inventor
James A. Fitzgerald,
By
Attorneys

Patented June 24, 1941

2,247,120

UNITED STATES PATENT OFFICE 2,247,120

CERAMIC BODY

James A. Fitzgerald, Detroit, Mich.

Application February 3, 1939, Serial No. 254,340

5 Claims. (Cl. 106—73)

This invention relates, in general, to building blocks or bricks and, in particular, to novel constituents therefor.

One of the objects of this invention is to provide a brick composed of substantially waste materials so that the cost thereof is minimum, and said materials having substantially the same temperature of fusion so as to combine when heated thereat to form a brick of great hardness.

Another object is to provide a new and improved brick the constituents of which comprise fly ash and a siliceous earthen material, the latter containing alumina and potassium oxide, said fly ash and said earthen material being mixed together with a binder into the desired shape and then fused together by heat.

Another object is to provide a new and improved brick which contains quantities of fly ash and siliceous earthen material having substantially the same temperature of fusion, said fly ash and siliceous material being mixed together by a binder into the desired shape and then homogeneously solidified by heating to said temperature, there being provided in the mixture a quantity of caustic material to equalize the relative expansions of the fly ash and siliceous material during their subjection to heat to prevent cracking.

Still another object is to provide a new and improved brick which is less expensive to make because of the materials used and because of the minimum time required therefor, which is sturdier and harder, and which is more molecularly homogeneous, than bricks at present well known.

A further object is to provide a new and improved brick the constituents of which are mixed by means of a binder, formed into the desired shape, glazed while still wet by means of any desired glazed coating, and then fired to fusion temperature, said constituents being homogeneously solidified at said temperature because each thereof has substantially the same fusion temperature, and said glazed coating being hardened and blended with that portion of the body of the brick thereadjacent.

Another object is to provide a new and improved brick which includes a pair of interfused siliceous materials the silica content of one of which being greater than the silica content of the other and each of which containing oxides of iron, aluminum, calcium, magnesium and titanium, the material having the greater silica content in addition containing oxides of sodium and potassium.

Other objects and advantages of the invention will become readily apparent from a reference to the following specification taken in conjunction with the accompanying drawing, wherein.

Practically all public utility companies and other such companies using enormous daily quantities of coal or coke have found the problem of ash disposal difficult, if not impossible, to solve. Accumulation of this ash, which to the art or field is known as fly ash because of its finely granulated or pulverized structure, has been inevitable as well as intensely serious, not only because of the huge quantities in which it is produced but also because of its ostensible waste nature. For these reasons the employment of fly ash for any useful purpose would incur little or no cost, and its abundance would seem to warrant a careful study toward the solution of a useful outlet therefor. Prior hereto, however, no such useful or practical outlet for fly ash has been found.

Fly ash may be classified as a siliceous material, its silica content being in the neighborhood of 46%, though fly ash also contains approximately 28% alumina, 10% iron oxide, 3.5% magnesium oxide, 3.5% calcium oxide and 1.5% titanium oxide.

Not as abundant as fly ash, though plentiful and similarly of primarily waste nature, is an earthen, siliceous material which is known to the art or field as Cobrecite, such material being classified as siliceous because its silica content is in the neighborhood of 60%, though Cobrecite also contains 13.5% alumina, 2.5% iron oxide, less than 1% magnesium oxide, about 1% calcium oxide, less than 1% titanium oxide, 1.5% sodium oxide and 4% potassium oxide, it being noted that the two latter oxides do not appear in fly ash. Cobrecite, it has been found, fuses at substantially the same temperature as fly ash, and it is to be found in this country in areas, such as Nevada.

Figure 1:
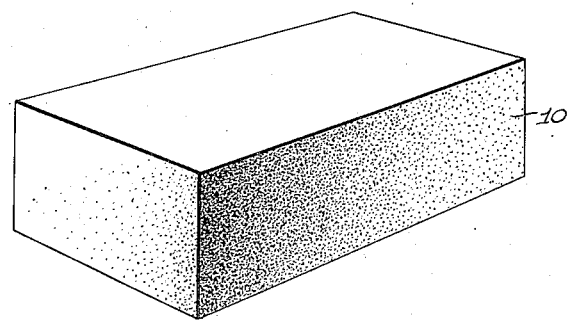
Figure 1 is a perspective view of the formed brick before coating or firing thereof.
Figure 2:
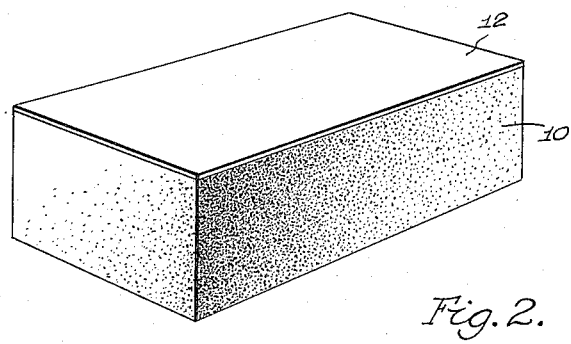
Figure 2 is a similar view of the brick after firing thereof and showing the optional decorative coating incorporated therewith.
Figure 3:
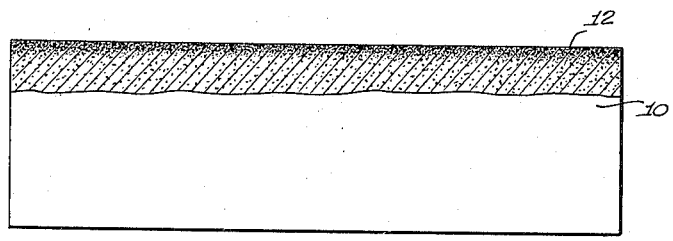
Figure 3 is a longitudinal sectional view taken through the brick of Figure 2.

It is proposed to employ fly ash and Cobrecite or its equivalent in the manufacture of building blocks or bricks, and for this purpose the former provides the base and the latter the body, a suitable and preferred ratio by weight therebetween being in the neighborhood of four to one. Quantities of fly ash and Cobrecite or its equivalent are mixed together in this preferred proportion of four to one in the presence of a binder, such as clay slip, a solution of water and clay dust, and this thoroughly mixed, wet mass is molded, cast or otherwise formed into the desired shape, such as the brick 10, said binder being clay slip because of its cheapness and effectiveness but same being replaceable by any other binding material which will effectuate and facilitate the moldability of said fly ash and Cobrecite into the desired form. Without undergoing any appreciable natural drying period, brick 10 may or may not be coated with a selected facing 12 which will withstand heat and ornament the brick as desired, whereupon the coated or uncoated brick is then placed in a firing oven and heated to that temperature at which the fly ash and Cobrecite fuse together, such temperature residing in the lower range of the limits of 700° F. and 2200° F. It will be noted in Fig. 3 that the coating 12 in the resulting brick has become blended with the base and body 10 thereof, and this brick is exceptionally hard and will withstand enormous compression pressures. The abundance and primarily waste nature of the fly ash and Cobrecite render the cost of the brick very low, and the fact that no natural drying of the brick prior to firing and/or subsequent to glazing is necessary renders the time element for the manufacture thereof very low, also.

It is clear that the application of the coating 12 to the wet brick 10 is optional, said brick being fired just as well, if desired, without said coating.

In order to insure little or no cracking in the fired brick, it has been found that the addition of a caustic, such as sodium hydroxide, to the wet mixture of fly ash and Cobrecite, during its shaping stage, will substantially equalize the relative expansions of said fly ash and Cobrecite during the firing stage, a proper and preferred amount of said caustic being in the neighborhood of one to six, by volume.

Although the invention has been described with some detail it is not intended that such detailed description is to be definitive of the limits of the inventive idea. The right is reserved to make such changes and substitutions as will come within the purview of the attached claims.

What I claim is:

1. As an article of manufacture, a heat-hardened, homogeneously mixed, ceramic body comprising, a quantity of coal ash dust particles, a quantity of Cobrecite, and a quantity of binder consisting of an intermixture of clay dust and water.

2. As an article of manufacture, a heat-hardened, homogeneously mixed, ceramic body comprising, a quantity of coal ash dust particles of given weight, a quantity of Cobrecite of weight approximately one-quarter that of said first quantity, and a quantity of an inter-binding admixture of water and earthen material.

3. As an article of manufacture, a heat-hardened, homogeneously mixed, ceramic body comprising, a quantity of coal ash dust particles, a quantity of Cobrecite, and a quantity of sodium hydroxide for controlling the expansion of said first two quantities.

4. As an article of manufacture, a heat-hardened, homogeneously mixed, ceramic body comprising, a quantity of coal ash dust particles of given volume, a quantity of Cobrecite of given volume, and a quantity of sodium hydroxide for controlling the expansion of said first two quantities and of volume approximately one-sixth the total of said first two volumes.

5. As an article of manufacture, a heat-hardened, homogeneously mixed, ceramic body comprising, a quantity of coal ash particles of given weight and volume, a quantity of Cobrecite of given volume and of weight approximately one-quarter that of said first weight, a quantity of sodium hydroxide for controlling the expansion of said first two quantities and of volume approximately one-sixth the total of said first two volumes, and a quantity of binder consisting of an inter-mixture of water and earthen material.

JAMES A. FITZGERALD.